(12) United States Patent
McCaslin et al.

(10) Patent No.: US 8,437,100 B2
(45) Date of Patent: May 7, 2013

(54) FLEXURE BASED SHOCK AND VIBRATION SENSOR FOR HEAD SUSPENSIONS IN HARD DISK DRIVES

(75) Inventors: Martin John McCaslin, Pleasanton, CA (US); Visit Thaveeprungsriporn, Bangkok (TH); Szu-Han Hu, Pathumthani (TH)

(73) Assignee: Nitto Denko Corporation, Osaka (JP)

(*) Notice: Subject to any disclaimer, the term of this patent is extended or adjusted under 35 U.S.C. 154(b) by 0 days.

(21) Appl. No.: 13/449,679

(22) Filed: Apr. 18, 2012

(65) Prior Publication Data
US 2012/0200959 A1 Aug. 9, 2012

Related U.S. Application Data

(62) Division of application No. 12/324,710, filed on Nov. 26, 2008, now Pat. No. 8,179, 629.

(60) Provisional application No. 61/016,769, filed on Dec. 26, 2007.

(51) Int. Cl.
*G11B 5/596* (2006.01)

(52) U.S. Cl.
USPC .......... 360/77.03; 360/77.05; 360/77.16; 360/78.11; 360/75; 360/235.4; 360/246.4; 360/294.4

(58) Field of Classification Search ........ 360/77.03, 360/77.05, 77.16, 78.11, 75, 246.4, 235.4, 360/294.4
See application file for complete search history.

(56) References Cited

U.S. PATENT DOCUMENTS

| | | | |
|---|---|---|---|
| 5,142,424 A | 8/1992 | Hatamura | |
| 5,404,252 A | 4/1995 | Nagasawa et al. | |
| 5,808,837 A | 9/1998 | Norton | |
| 5,862,015 A | 1/1999 | Evans et al. | |
| 5,942,744 A * | 8/1999 | Kamo et al. | 235/487 |

(Continued)

FOREIGN PATENT DOCUMENTS

| | | |
|---|---|---|
| JP | 60136972 A | 7/1985 |
| JP | 1153856 A | 2/1999 |
| JP | 2003217244 A | 7/2003 |
| JP | 2005156529 A | 6/2005 |

OTHER PUBLICATIONS

Japenese Office Action, corresponding to Application No. 2008-317397, dated Jul. 19, 2011.

(Continued)

*Primary Examiner* — Viet Q Nguyen
(74) *Attorney, Agent, or Firm* — Sughrue Mion, PLLC

(57) ABSTRACT

Systems and methods for flexure based shock and vibration sensor for head suspensions in hard disk drives. Specifically, this invention deals with operational shock and vibration management within a hard disk drive. In one implementation, the assembly includes a circuit embedded optical waveguide sensor that includes a flexible electrical circuit board with a configuration of either a single or multi layers of conductor traces, a thin flexure gimbal for carrying and flying a HDD slider, a consecutive sensing layer constructed by an optical core and by clad construction with a configuration of either a single core array or a plural core array, an optical loop formed by light input and an output core, optical grating disposed on the consecutive sensing layer forming an optical grating waveguide sensor, a light emitter for injecting light into the optical core, and a receiver receiving the output light from the optical core.

2 Claims, 12 Drawing Sheets

U.S. PATENT DOCUMENTS

| | | | |
|---|---|---|---|
| 5,987,725 A * | 11/1999 | Church et al. | 29/407.05 |
| 6,163,434 A | 12/2000 | Zhang | |
| 6,166,874 A | 12/2000 | Kim | |
| 6,181,520 B1 | 1/2001 | Fukuda | |
| 6,212,026 B1 | 4/2001 | Ohmi et al. | |
| 6,243,350 B1 * | 6/2001 | Knight et al. | 369/126 |
| 6,306,008 B1 | 10/2001 | Moore | |
| 6,310,746 B1 * | 10/2001 | Hawwa et al. | 360/97.19 |
| 6,600,619 B1 | 7/2003 | Morris et al. | |
| 6,654,130 B2 | 11/2003 | Berger et al. | |
| 6,704,157 B2 | 3/2004 | Himes et al. | |
| 6,771,454 B2 | 8/2004 | White et al. | |
| 6,778,348 B1 * | 8/2004 | Carley | 360/75 |
| 6,807,332 B1 | 10/2004 | Hawwa | |
| 6,888,694 B2 | 5/2005 | Guo et al. | |
| 6,909,571 B2 | 6/2005 | Boljanovic | |
| 7,000,459 B2 * | 2/2006 | Riddering et al. | 73/105 |
| 7,034,372 B1 * | 4/2006 | Kulangara et al. | 257/415 |
| 7,110,626 B2 * | 9/2006 | Tsai | 385/12 |
| 7,249,520 B1 * | 7/2007 | Zhu et al. | 73/760 |
| 7,315,435 B1 * | 1/2008 | Pan | 360/245.2 |
| 7,362,535 B2 * | 4/2008 | Kumano | 360/75 |
| 7,538,963 B2 * | 5/2009 | Che | 360/69 |
| 7,564,649 B2 | 7/2009 | Hanchi et al. | |
| 7,667,932 B2 | 2/2010 | Kwon et al. | |
| 7,770,231 B2 | 8/2010 | Prater et al. | |
| 7,813,083 B2 | 10/2010 | Guo et al. | |
| 8,179,629 B2 * | 5/2012 | McCaslin et al. | 360/77.03 |
| 2003/0133218 A1 | 7/2003 | Guo et al. | |
| 2005/0109922 A1 | 5/2005 | Tsai | |

OTHER PUBLICATIONS

Decision of Refusal corresponding to Japanese Application No. 2008-317397 dated Nov. 15, 2011.

* cited by examiner

FLEXURE BASED SHOCK AND VIBRATION SENSOR FOR HEAD SUSPENSIONS IN HARD DISK DRIVES

CROSS-REFERENCE TO RELATED APPLICATION

This application is a divisional application of U.S. application Ser. No. 12/324,710, filed Nov. 26, 2008, which is based on and claims the benefit of priority under 35 U.S.C. 119 from provisional U.S. patent application No. 61/016,769, filed on Dec. 26, 2007, the entire disclosure of which is incorporated by reference herein.

FIELD OF THE INVENTION

This invention generally relates to data storage technology and more specifically to operational shock and vibration management within a hard disk drive.

DESCRIPTION OF THE RELATED ART

With the increased use of data storage applications in portable consumer electronic devices, such devices are required to deliver high mobility with stringent durability. The primary concerns for portable hard disk drives (HDD), used in many portable consumer electronic devices, are shock performance and preventing loss of customer data.

Due to the inherent design features of HDDs, they are especially susceptible to external mechanical shocks. For example, HDD operation and slider head gimbal motion are highly dynamic and critical, due to the slider head flying at a height of 5-18 nanometers above the magnetic surface of the disk. Shock induced slider head motion is the most common factor for data/media damage.

To prevent the head-media from crashing while track seeking, any large shocks or vibrations occurring on the suspension gimbal need to be detected in order to shut off the write gate and/or unload the slider to a ramp to prevent data/media damage. Most portable HDDs are equipped with a shock sensor. However, due to the complexity of the HDD architecture, with the current state of the art, the sensor can only be located on a rigid printed circuit board (PCB). Although such a sensor can sense the HDD drop and shock, it is unable to sense motion occurring in the suspension or the head. Furthermore, false positive shock detections can occur due to the remoteness of the sensor from the HDD head. For example, a legitimate shock pulse could occur at the remote location, yet pose no risk to the head itself. This results in a throughput performance penalty.

SUMMARY OF THE INVENTION

The inventive methodology is directed to methods and systems that substantially obviate one or more of the above and other problems associated with false sensing of shock and vibration due to the remote position of existing methods.

In accordance with one aspect of the present invention, there is provided a hard disk drive (HDD) head carrying assembly including a base plate mounted on a hard disk drive; and a trace gimbal assembly pivotally attached to the base plate and load beam. The aforesaid trace gimbal assembly includes a gimbal region rotably movable with respect to the load beam; a thin flexure gimbal to carry and fly a HDD head, the HDD head disposed in a proximity of an edge of the gimbal assembly; a flexible electrical circuit board with a configuration in either single or multi layers of conductor traces; and a strain sensor positioned between the point where the trace gimbal assembly is pivotally attached to the base plate and the distal edge of the gimbal assembly.

In accordance with another aspect of the present invention, there is provided a hard drive head carrying assembly including a base plate mounted on a hard disk drive; and a trace gimbal assembly pivotally attached to the base plate and load beam. The aforesaid trace gimbal assembly includes a gimbal region rotably movable with respect to the load beam; a flexure gimbal to carry and fly a HDD head; a flexible electrical circuit board; a free cantilevered portion, wherein the free cantilevered portion comprises a fixed end attached to at least a portion of the gimbal assembly and a free end; and at least one motion sensor mounted onto the free cantilevered portion.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Figure 1:
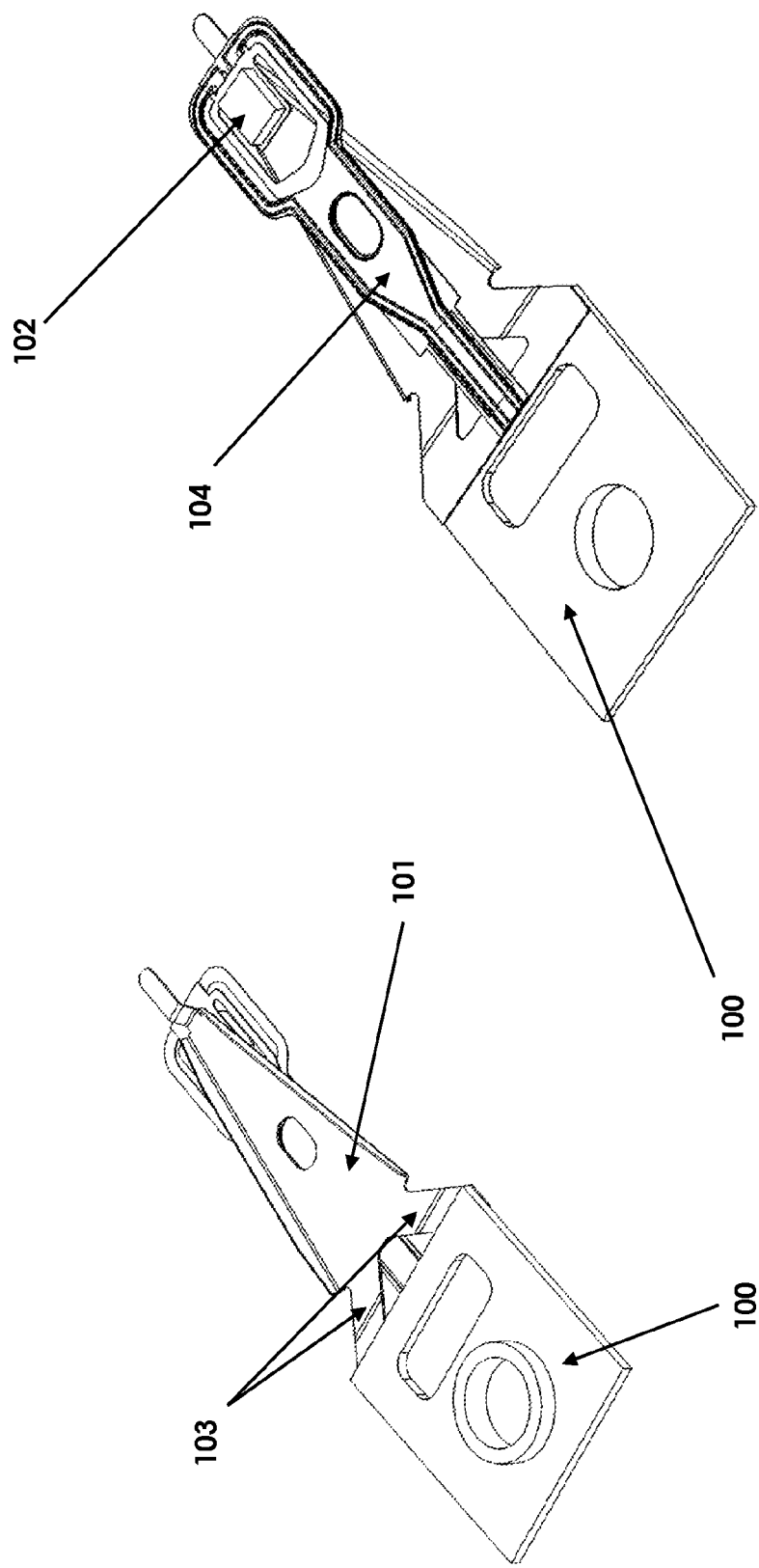
FIG. 1 illustrates an exemplary diagram of a hard disk drive head carrying assembly.

FIG. 1 illustrates a typical hard disk drive head carrying assembly, or head gimbal assembly. A base plate/mount plate 100 is mounted onto the hard disk drive in order to carry the load beam or load arm 101. The load beam holds the trace gimbal assembly 104, which holds the slider head 102 and flies it above the disk surface at a height of 5-18 nanometers. Hinge regions 103 are dispersed onto the load beam to engage or disengage the slider.

Figure 2:
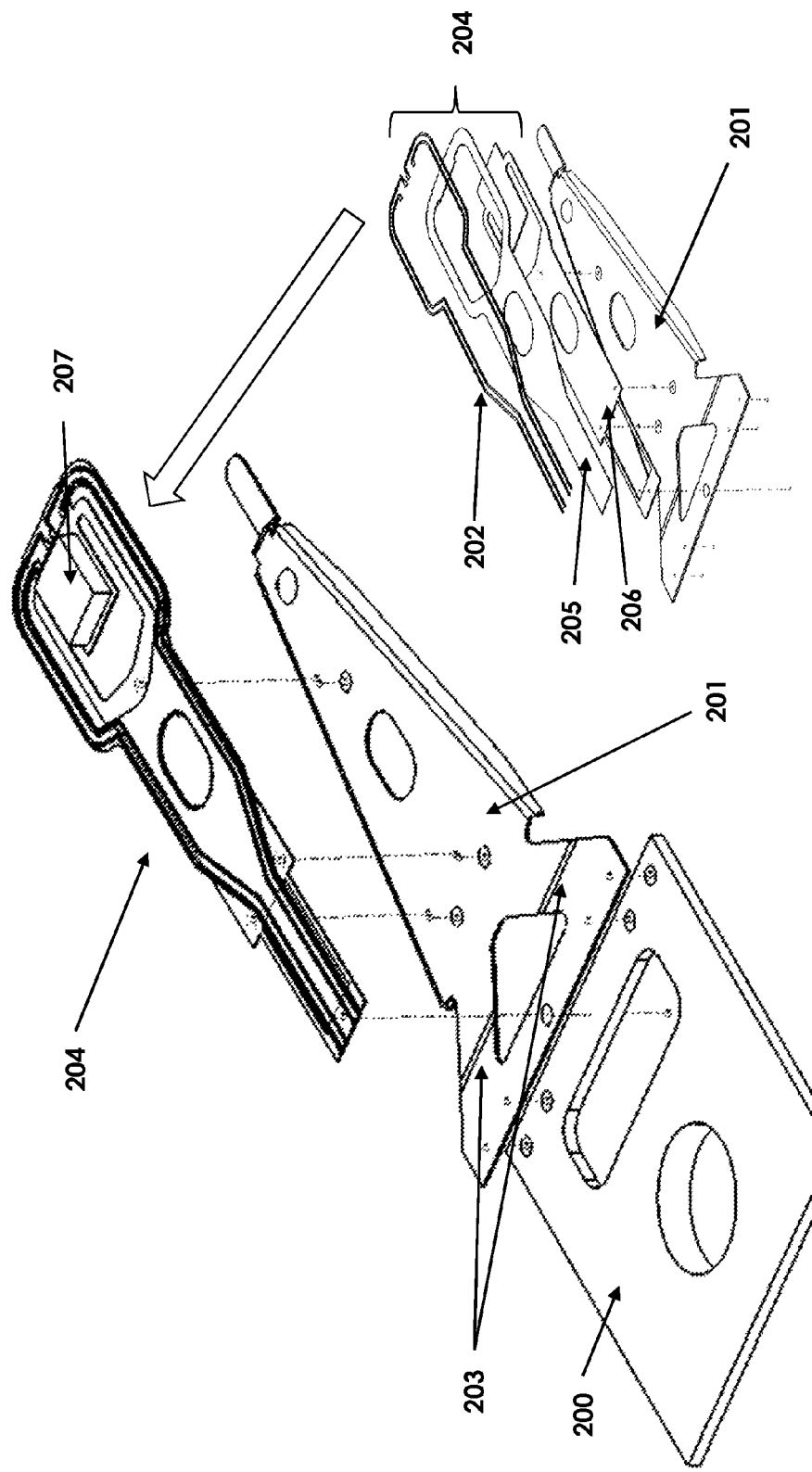
FIG. 2 illustrates an exemplary diagram of the various layers in the trace gimbal of a head carrying assembly.

FIG. 2 illustrates the various gimbal layers of the head carrying assembly. A trace gimbal flexure 204 is welded onto the load beam using flexure welds. The trace gimbal flexure has an insulative polyimide layer 205 on top of a SST layer 206. Electrically conductive traces 202 reside on top of the polyimide 205, for transmission of signals to and from the head 207.

Figure 3:
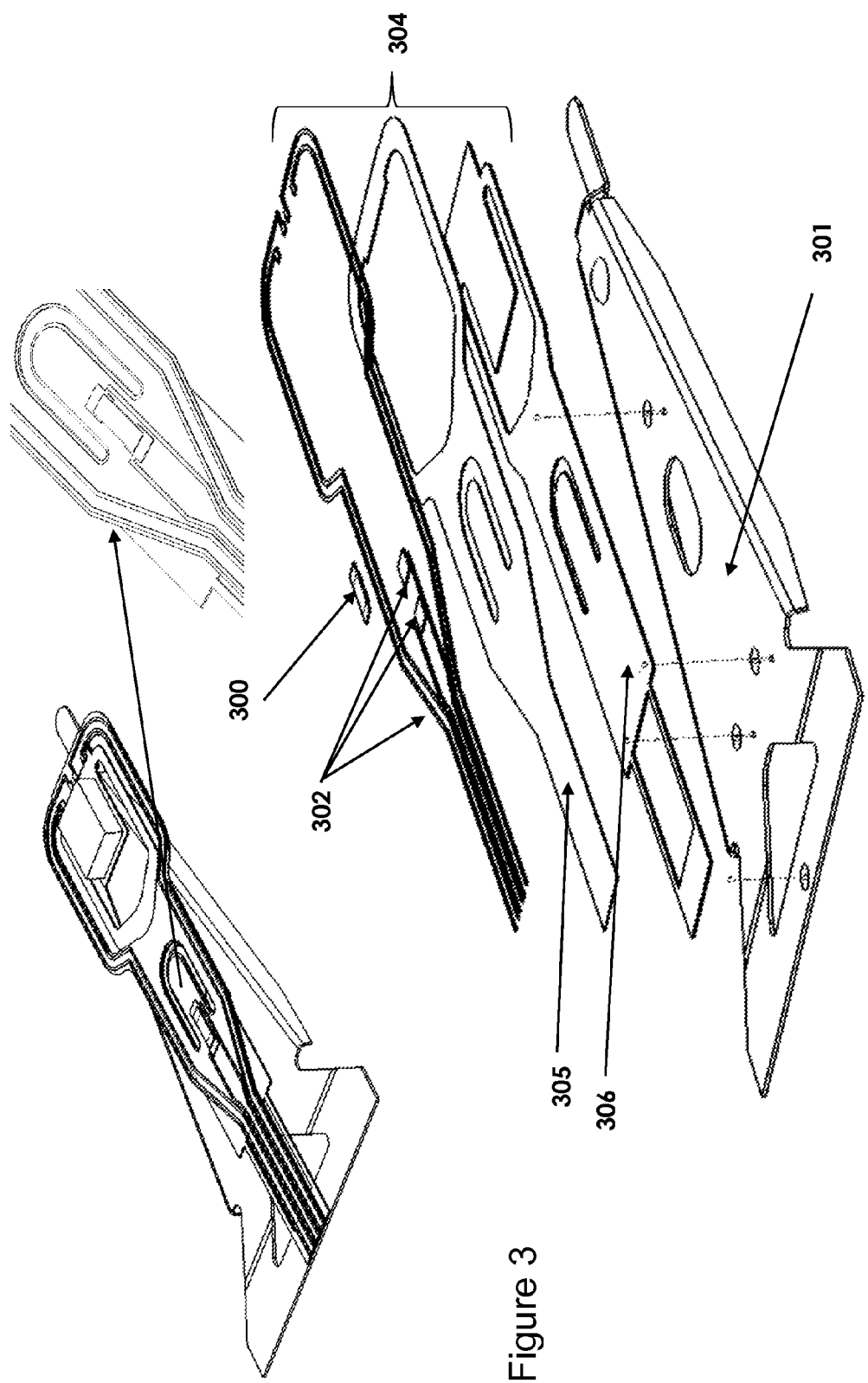
FIG. 3 illustrates an exemplary embodiment of a sensor placement in conjunction with a cantilever according to the present invention.

FIG. 3 illustrates an exemplary embodiment of a sensor placement in conjunction with a cantilever according to the present invention. In the present invention, an ideal location for co-locating the sensor for detecting head motion is on the flexure gimbal circuit. Hence in FIG. 3, the sensor 300 is placed at the root of a cantilever beam 301 displaced in either the SST layer 306 or the polyimide layer 305 of the trace gimbal flexure. Electrically conductive traces 302 are provided for transmission of signals to and from the head 207, and also for connecting sensor 300 signals. Sensor 300 can be adhered to exposed pads in trace layer 302, with one trace being either grounded, or open, depending on the electronic sensing scheme. The cantilever is characterized with a fixed end and a free end. When shock or vibrations are induced onto the head gimbal assembly and trace gimbal, the free end of the cantilever will displace, which is subsequently detected by the sensor located in the high strain region. This basic cantilevered member can have many possible configurations, with the highest strain energy components being available at the root of the free beam. Various sensing means are also possible by strain detection (such as by strain gage or by a piezoelectric device), by other high gauge factor materials, or by optical means.

Figure 4:
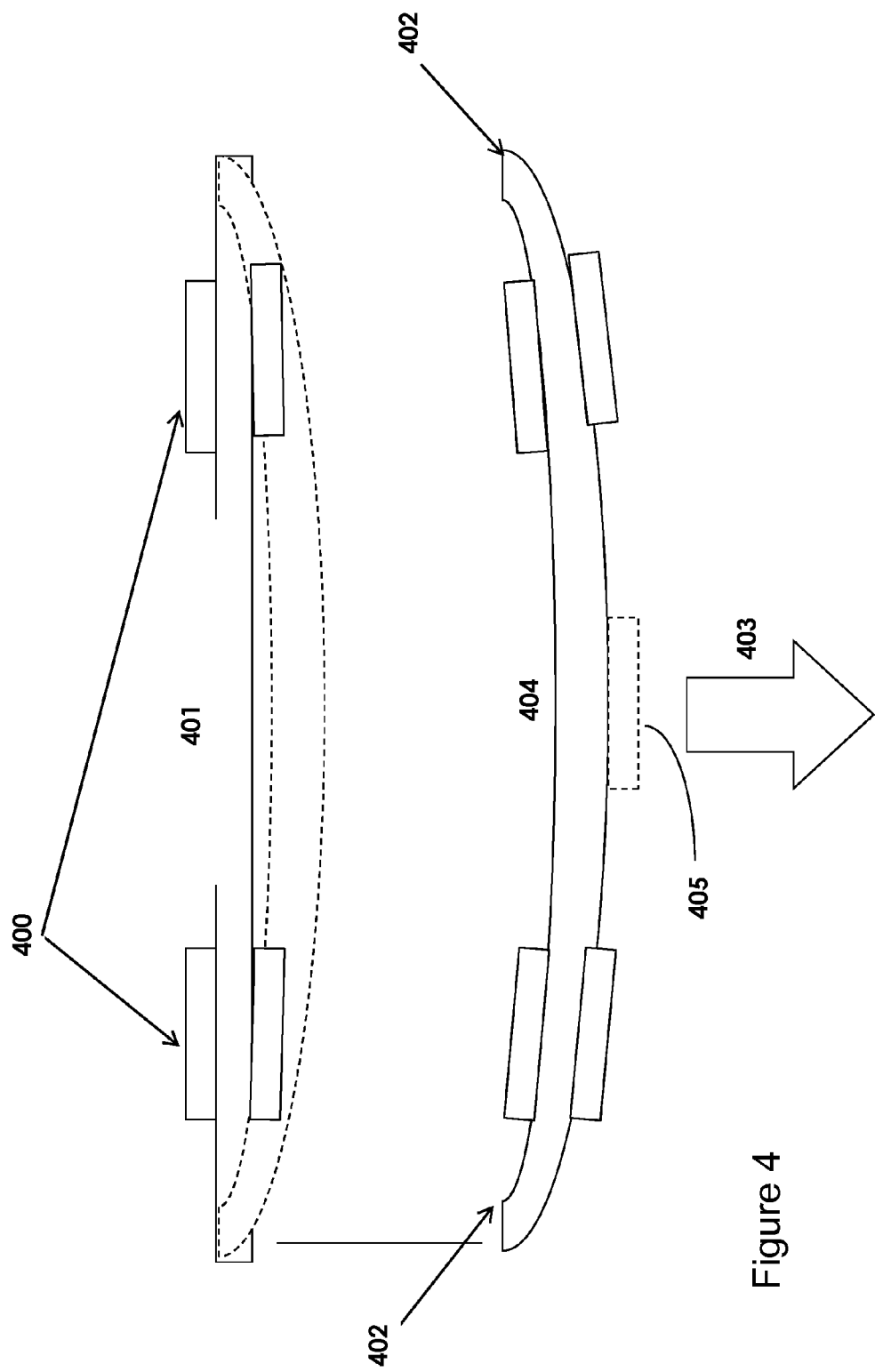
FIG. 4 illustrates an exemplary embodiment of a fixed-fixed beam sensor arrangement.

Of course, other arrangements may be implemented and a cantilever is merely one example. For example, FIG. 4 illustrates an example embodiment of a fixed-fixed beam sensor arrangement. The fixed-fixed beam utilizes two fixed ends 402 with sensors 400 dispersed on or about the beam. When the trace gimbal is functioning normally, the beam remains undeformed 401. However, when shock or vibrations are induced into the gimbal, the inertia of beam 401 will deform as depicted in 404, which is subsequently detected by the sensors. Other sensor locations 405 are also possible within this configuration. Any number of sensors could be introduced for shock sensing.

Another advantage of this invention is that the axis and orientation of the sensor rotates with the actuator arm. Radial shock is always purely radial with the present invention. In contrast, a remotely located sensor, such as a sensor located on the main HDD PCB or the actuator connector, will have the head radial line of action rotating relative to the sensing axis, depending on where on the disk the data is being written or read. The outer diameter of the disk position can differ from the inner diameter position by as much as 40 rotational degrees.

Another advantage of this invention is that each head can have its own sensor. So on a two platter, four head disk drive, there is triple redundancy. Further, there is amplification inherent in sensing the vibrating cantilever or fixed-fixed beams. Typical damping in metal structures is 0.5% of critical damping, which corresponds to a 100× amplification at the resonance frequency.

We describe the sensing mechanics, as being implemented into a central region of the flexure gimbal circuit and midspan in the suspension loadbeam, but any suitable location would fall within the scope and spirit of this invention. For example, other critical locations include locations from the base plate all the way to an extension just beyond the head itself.

An Example of the Optical Sensing Means

Figure 5:
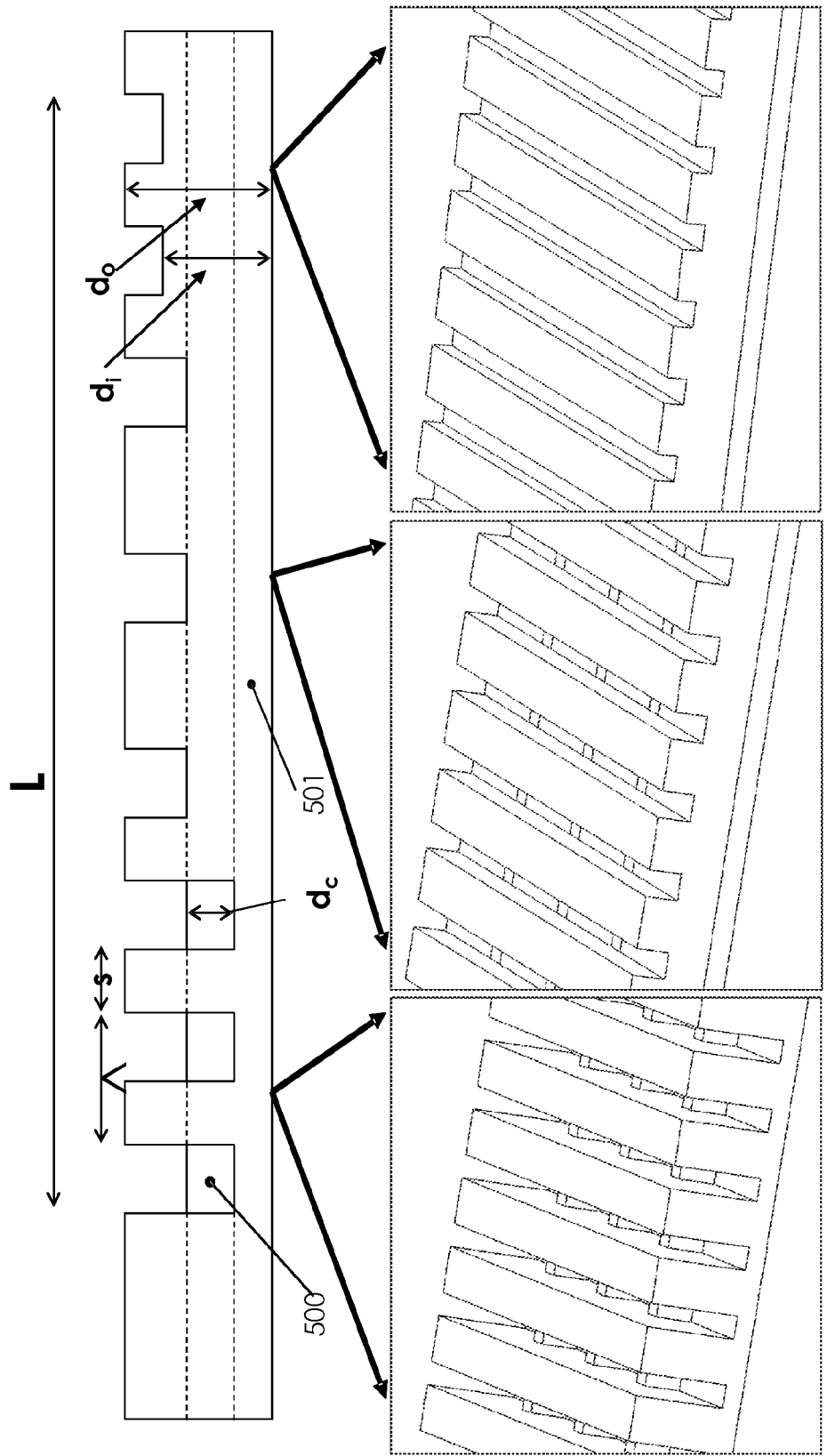
FIG. 5 illustrates critical geometry parameters that affect the waveguide sensitivity.

FIG. 5 illustrates critical geometry parameters that affect the waveguide sensitivity. The characteristics of a light transmission in an optical waveguide depend highly on the interface properties between the core 500 and clad 501, in particular the reflective index delta. Creating an optical grating on the waveguide allows for the manipulation of light wavelength. Such gratings couple the fundamental mode with the cladding modes of the core, propagating in the same direction. The excited cladding-mode attenuates in the cladding core portion after the grating, which results in the appearance of resonance loss in the transmission spectrum. L=Grating Length, Λ=Grating Pitch, s=Grating Width, di=Grating Depth, do=Clad thickness, and dc=core height.

Another major mechanism to induce light loss in the transmission is through photoelasticity manipulation. Based on the photoelastic effect, reflectivity is made to be proportional to strain, and light loss due to the coupling of the cladding-mode is related to reflectivity. When mechanical loading is applied, Λ (period) is manipulated, i.e. the resonant wavelength changes with a change in period, Λ. Therefore, creating gratings on waveguide enables and further enhances the mechanical loading (photoelastic) effect on the waveguide. This kind of optical structure could work as a sensor that responds to mechanical, thermal, as well as other environmental influences.

On example of a material and process that could fulfill the cost problems and yet meet key functional requirements, would be a Polymer (epoxy) Waveguide. By using a photosensitive polymer or epoxy and a photolithography or laser direct imagining process to construct both the optical waveguides and the electrical conductors on a hybrid circuit, it is possible to cost effectively mass fabricate a grating waveguide sensor on a gimbal trace, i.e., flexure gimbal circuit, for use in the HDD suspension. The present invention therefore provides a gimbal trace embedded shock sensor to be co-located on the HDD suspension.

In addition to the superiority on manufacturability and cost, optical waveguide sensors provide numerous engineering benefits on HDD application. Such benefits include immunity to electromagnetic interference (EMI), no data drifting, a linear response in a wide data range, the potential to combine different kinds of sensors on a waveguide array, the capability of detecting temperature with a different grating design, having a miniature system with the emitter+sensor+receiver/+transceiver packed and sealed on a suspension arm, easing of space limitations, and material cleanliness suitable for typically stringent HDD requirements. With an integrated hybrid circuit process, the sensor is also directly embedded in circuit, thereby generating a higher process yield than conventional types of sensors that require post assembly. The sensor is also flexible with a simple structure to provide MEMS level sensitivity. Finally, fine resolution sensing can be utilized, which makes the sensor capable of micro level and real-time basis sensing.

Numerous benefits are achieved by using the present invention over MEMS and PZT shock sensors. For example, the present invention can be implemented by using existing fabrication technologies, such as photolithography and LASER direct imagining or e-beam writing. The invention can also be easily fabricated on an electrical flexible circuit board by being integrated into a semi-additive process of CISFLEX™. In addition, the present invention can readily realize high process yield with micro level structure and cost saving by eliminating a post sensor assembly. One or more of these benefits may be realized depending on the benefit. These and other benefits are described throughout the present specification and more particularly below.

The HDD suspension is a highly sophisticated and well optimized mechanical slider carrier. Hence, any extra mass inertia or any inappropriate geometry changes will cause resonant performance degradation and penalty on lower G to lift-off. The current invention takes into account of critical parameters of a suspension and carefully plans the configuration for a feasible sensor solution.

A corrugated geometry enhances the differential strain along the waveguide core-clad interface which results in a larger wave characteristic change, thus enhancing the sensor sensitivity to mechanical loading. When subject to bending, the transmission gain drops as bending increases with the intensity of the gain drop being proportional to the resonant wavelength drop (due to the differential strain). The waveguide sensor presented here is capable of determining micro strain. The waveguide sensor also exhibits the same characteristics as bending when it is subjected to torsion, for example in a cross-axis shock event. When tensile stress is applied, the resonant wavelength remains stable yet the transmission gain drop will become very sensitive to increases in tensile stress.

Such waveguide characteristics inspired the inventors to use a photosensitive polymer or epoxy to form a waveguide grating sensor on a semi-additive electrical circuit board (in particular CISFLEX™), with the integrated process which eliminates post sensor assembly on a circuit board that potentially results in higher yield and more accurate co-located sensing.

The scheme in FIG. 6 to FIG. 10 demonstrates the potential circuit embedded waveguide sensor configuration for HDD suspension motion sensing.

Figure 6:
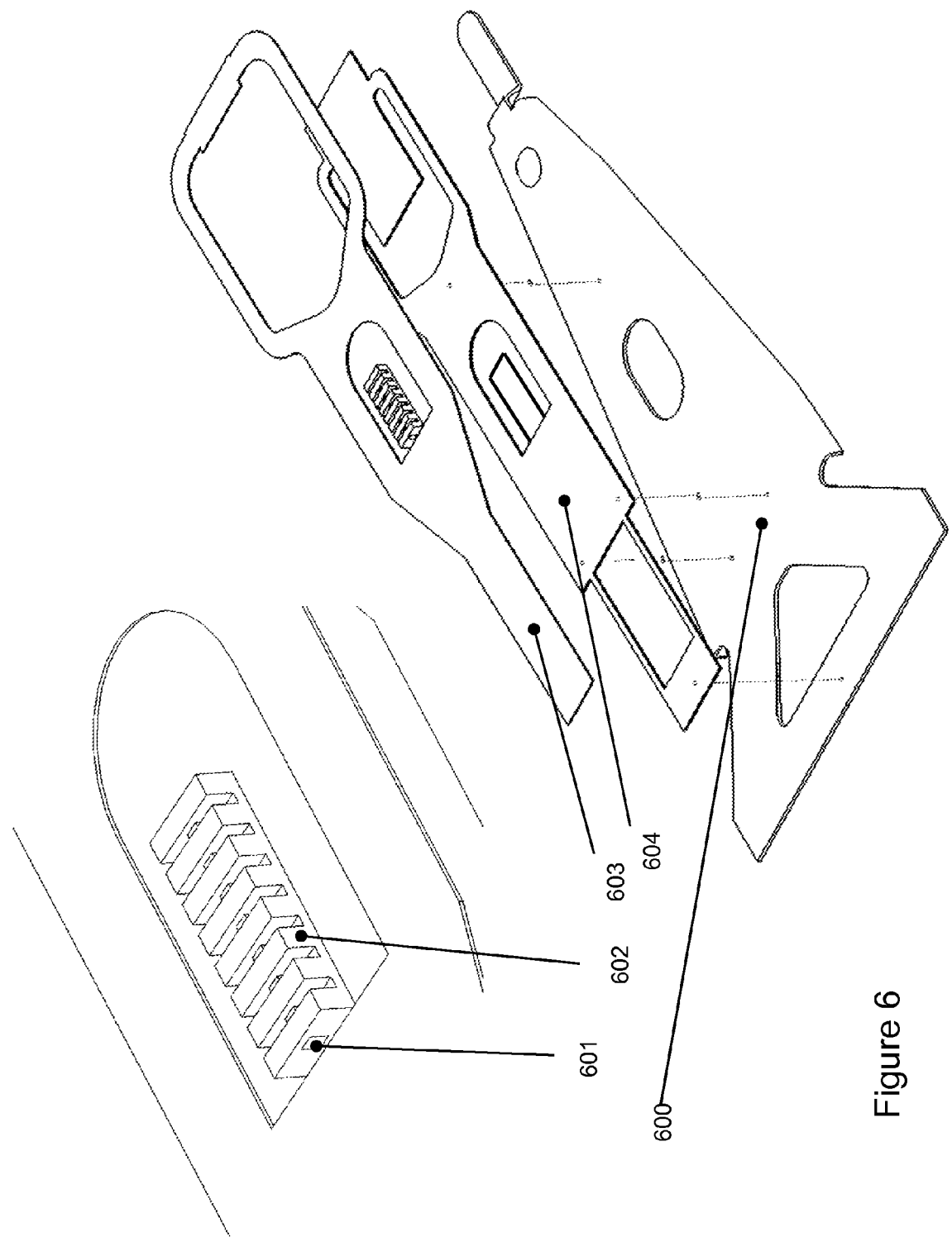
FIG. 6 depicts a scheme for the flexure gimbal circuit embedded waveguide grating sensor.

FIG. 6 depicts a scheme for the flexure gimbal circuit embedded waveguide grating sensor. In this figure, a configuration is shown to demonstrate a potential position on suspension loadbeam 600 to host the waveguide sensor with the waveguide core 601 and clad 602, relative to the polyimide layer of the trace gimbal circuit 603 and stiffener or SST layer of the trace gimbal flexure 604. The design configuration here is merely an example which should not unduly limit the applicability and scope of the claims herein. One of ordinary skill in the art would recognize many other variations, modifications, and alternatives.

Figure 7:
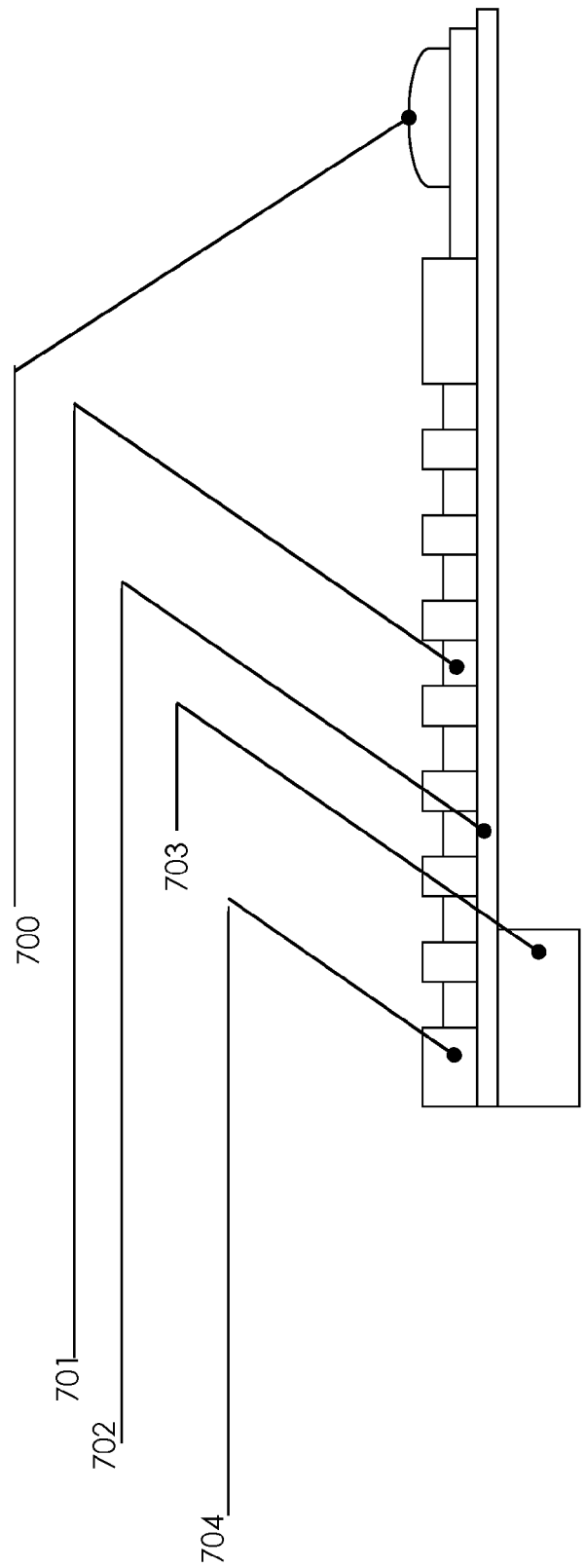
FIG. 7 depicts an exemplary cross section view of a waveguide grating sensor.

FIG. 7 depicts an example cross section view of a waveguide grating sensor, depicting a potential design scheme incorporating the wave guide core 701, the bottom clad 702, the top clad 704 and the stiffener or the SST layer of the trace gimbal flexure 703. This figure shows a potential design scheme of a single-sided corrugated long-period grating waveguide sensor which contains materials and structures that are compliant with a semi-additive circuit process (in particular, CISFLEX™). The concentrated mass 700 which could be formed (for example by solder paste) is optionally implemented to tune the sensor resonance as well as to enhance the sensor dynamic response by increasing inertia, thereby behaving as a tuned mass vibrator. Topology of the metal layer (such as copper or stainless steel) could also be manipulated to tune the sensor resonance.

Figure 8:
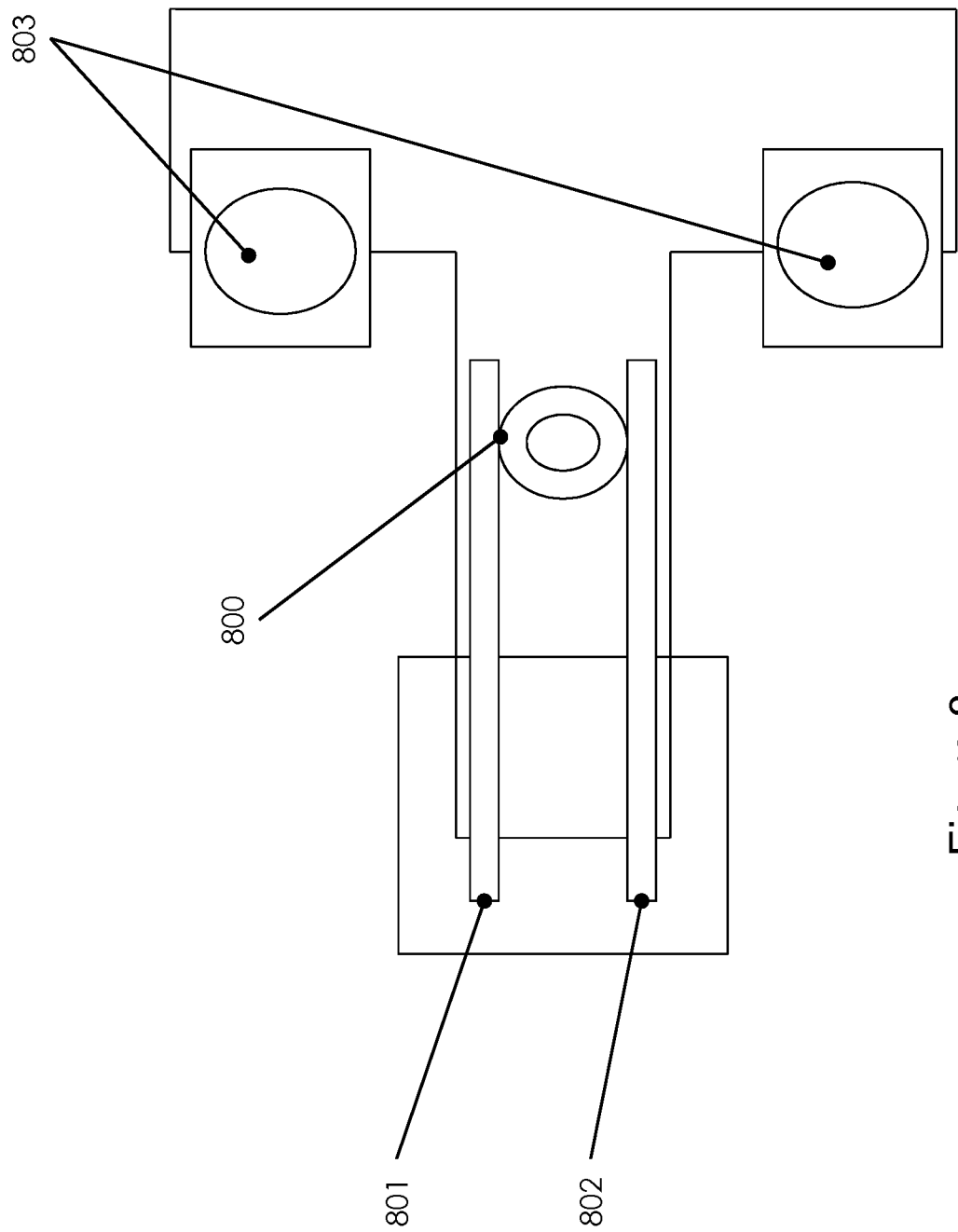
FIG. 8 illustrates an exemplary design scheme with a ring resonator serving as a light return path.

FIG. 8 illustrates an example design scheme with a ring resonator serving as a light return path. A ring resonator 800 serves as a light returning path, utilizing an input core 801 and an output core 802, they extend off of, or are mounted onto a portion of the polyimide and/or SST trace gimbal assembly. The symmetric pair of concentrated mass 803 could enhance torsion response of the sensor as well as bending sensitivity.

Figure 9:
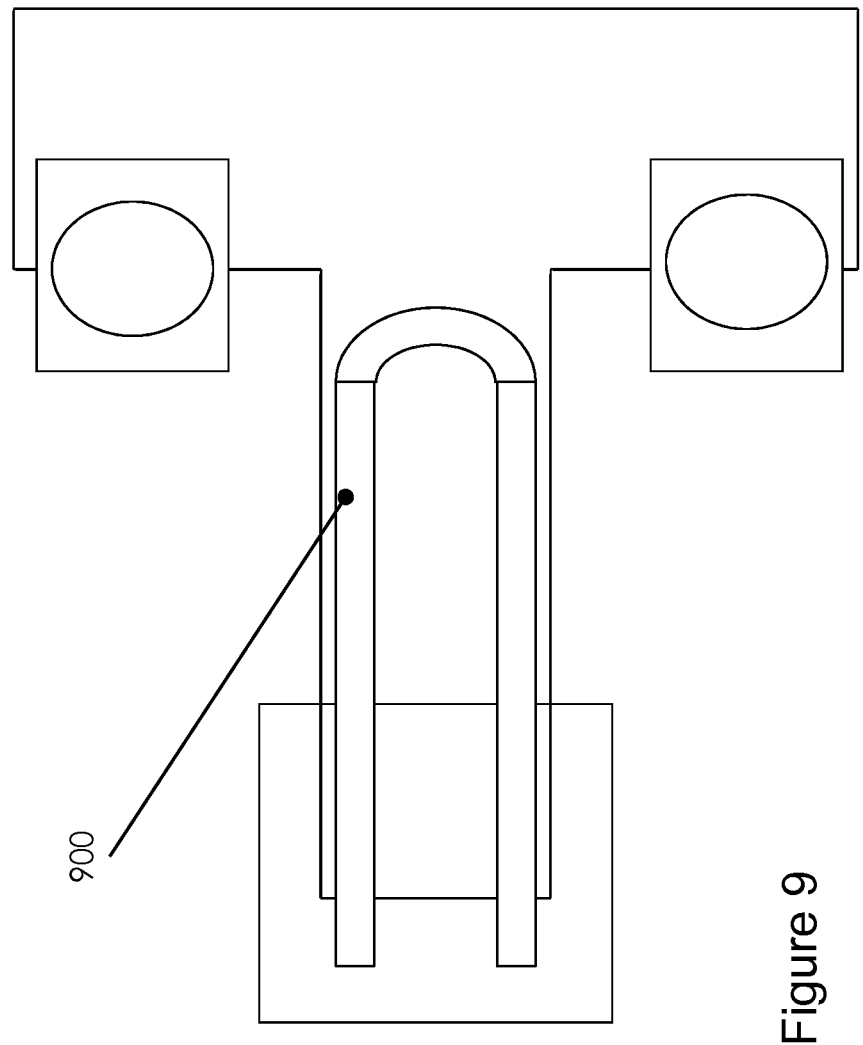
FIG. 9 illustrates an exemplary design scheme utilizing an optical loop serving as a light return path.

Alternatively, FIG. 9 illustrates an example design scheme with an optical loop serving as a light return path. The same principles in FIG. 8 are adopted, but with a simple core u-turn 900 to form the light return path. For the ease of illustration, the grating structure is eliminated from FIGS. 8 and 9. The design configurations demonstrated here are merely examples which should not unduly limit the applicability and scope of the claims herein. One of ordinary skill in the art would recognize many other variations, modifications, and alternatives.

Figure 10:
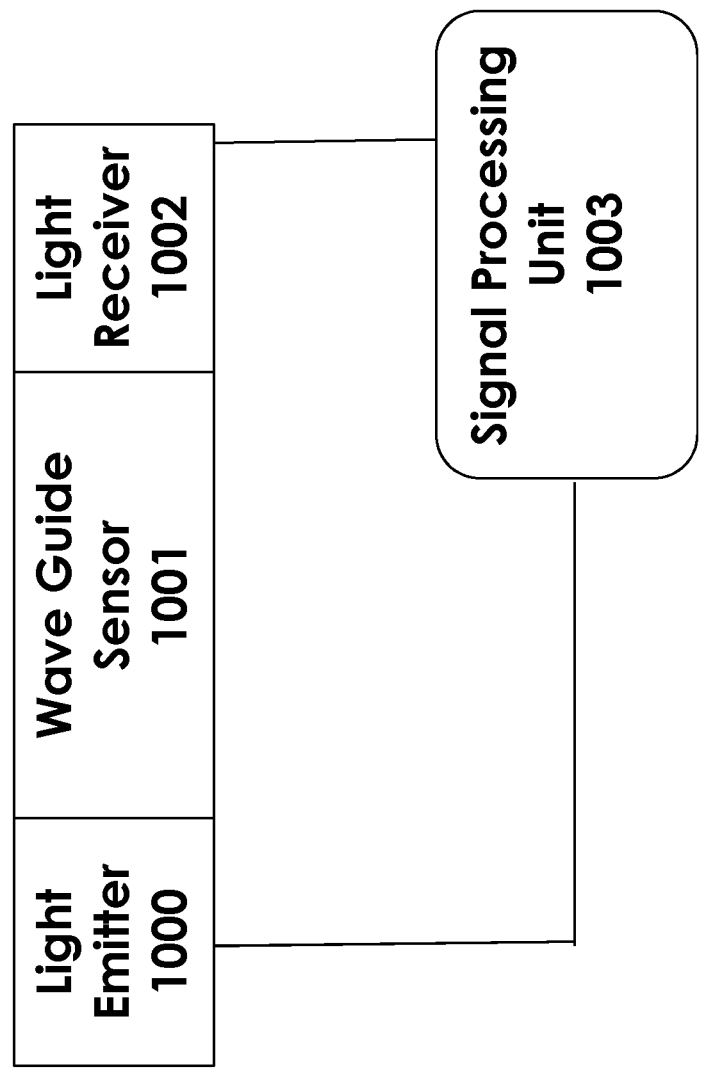
FIG. 10 provides a simplified system scheme for the waveguide sensor.

FIG. 10 provides a simplified system scheme for the waveguide sensor that can enable control signals to the disk drive electronics. The system contains an emitter 1000 which can be a bright LED or a micro semiconductor laser chip or a vertical cavity surface emitting laser (VCSEL), and the receiver 1002 can be a photo diode and or a micro spectrometer. Both emitter and receiver could be mounted on the suspension arm or trace gimbal assembly with I/O provided by the hybrid circuit which potentially minimizes the entire optical sensor system and optical losses, in case a lengthy waveguide is used. The light enters the waveguide sensor 1001 from the emitter, and is received by the receiver. The light received by the receiver is subsequently processed by the processing unit 1003. The system configuration depicted here is merely an example, which should not unduly limit the scope of the claims herein. One of ordinary skill in the art would recognize many other variations, modifications, and alternatives.

Figure 11:
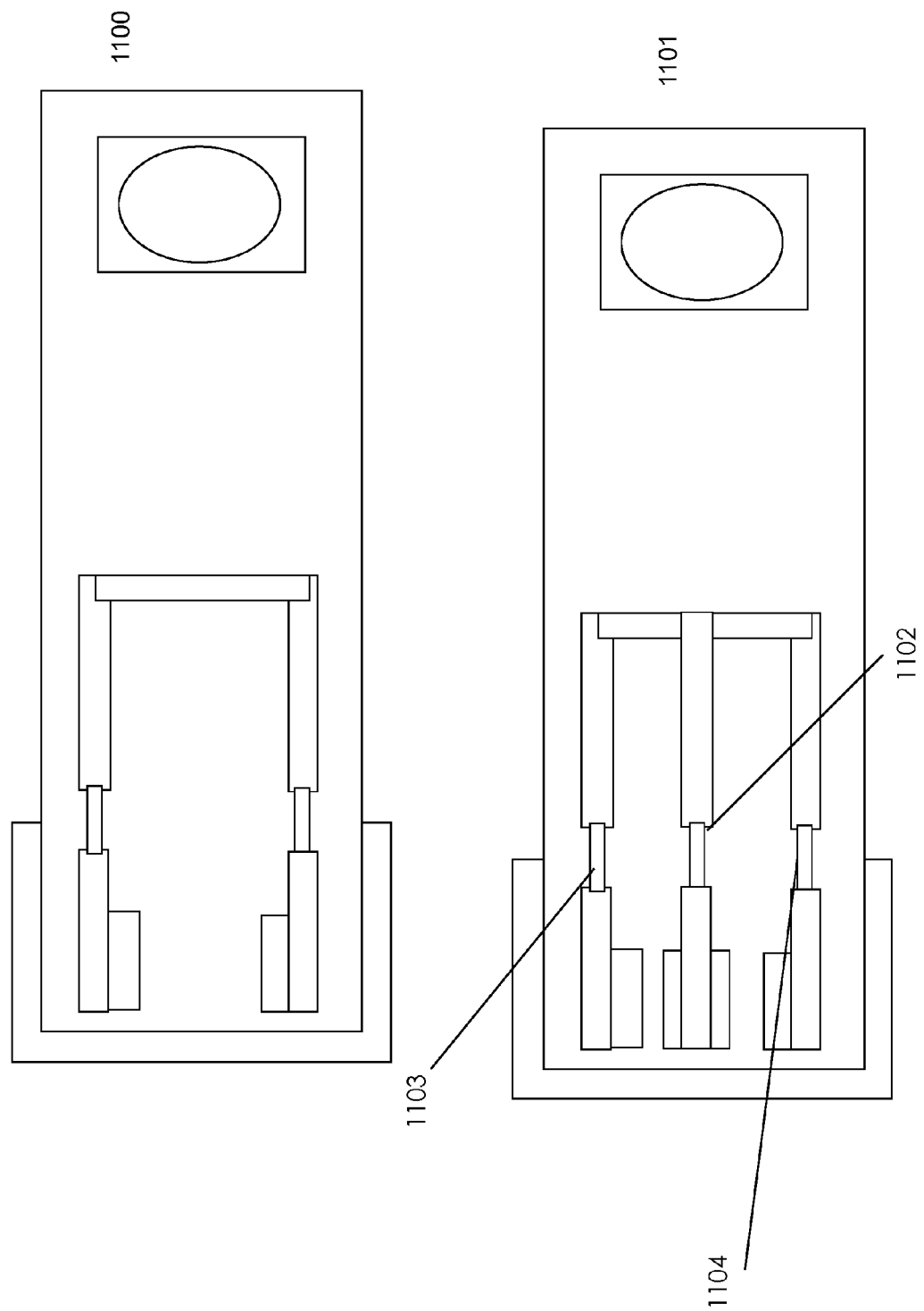
FIG. 11 illustrates a multiple sensing arrangement in order to enable both lateral and axial detection.

FIG. 11 illustrates a multiple sensing arrangement in order to enable both lateral and axial detection. As depicted in 1100, a dual sensor arrangement in series can be utilized to enhance the signal level sensitivity if needed. Alternatively, multiple sensing can also be utilized as illustrated in 1101. In the illustration in 1101, three sensing elements 1102, 1103, and 1104, are utilized with 1102 and 1103 in series with each other, 1102 and 1104 in series with each other and 1103 and 1104 in parallel with each other. The result allows for enhanced sensitivity and lateral detection. For example, the sensing element 1102 can behave as a reference element for 1103 and 1104, allowing the sensor to judge if the motion inflicted is lateral or axial. Of course, such a configuration is merely an example and one of ordinary skill in the art would recognize many other variations, modifications, and alternatives.

Figure 12:
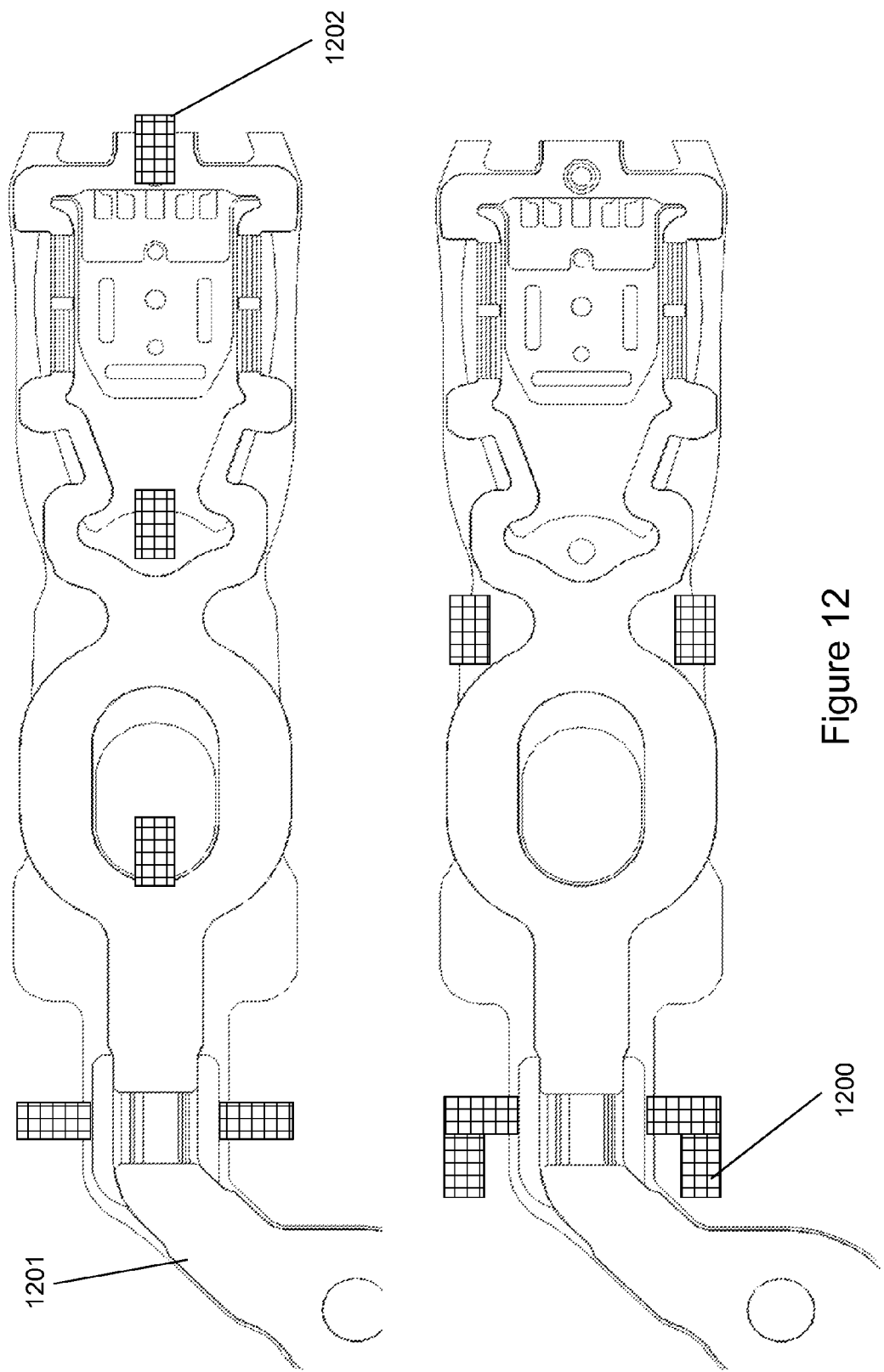
FIG. 12 illustrates an example of possible sensor locations.

FIG. 12 illustrates an example of possible sensor locations. Examples of possible sensor locations 1200 are indicated in the gridded areas of the figure. However, the indicated locations are merely examples. The strain sensors as described may be positioned anywhere between the base plate 1201 and the distal edge of the assembly (as indicated by sensor location 1202).

Moreover, other implementations of the invention will be apparent to those skilled in the art from consideration of the specification and practice of the invention disclosed herein. Various aspects and/or components of the described embodiments may be used singly or in any combination for sensing shock in the HDDs. It is intended that the specification and examples be considered as exemplary only, with a true scope and spirit of the invention being indicated by the following claims.

What is claimed is:

1. A hard drive head (HDD) carrying assembly, comprising:
   a base plate mounted on a hard disk drive; and
   a trace gimbal assembly pivotally attached to the base plate and a load beam, the trace gimbal assembly comprising:
      a gimbal region rotably movable with respect to the load beam;
      a flexure gimbal to carry and fly a HDD head;
      a flexible electrical circuit board;
      a free cantilevered portion, wherein the free cantilevered portion comprises a fixed end attached to at least a portion of the gimbal assembly and a free end; and
      at least one motion sensor which is an optical sensor mounted onto the free cantilevered portion.

2. The hard drive head carrying assembly of claim 1, further comprising a balance weight provided on the free cantilevered portion.

* * * * *